United States Patent
Matsubara et al.

(10) Patent No.: US 9,909,080 B2
(45) Date of Patent: Mar. 6, 2018

(54) GREASE COMPOSITION AND MECHANICAL PART

(75) Inventors: Kenichiro Matsubara, Fujisawa (JP); Terasu Yoshinari, Fujisawa (JP); Ryo Aida, Fujisawa (JP); Junichi Imai, Fujisawa (JP)

(73) Assignee: KYODO YUSHI CO., LTD., Fujisawa (JP)

( * ) Notice: Subject to any disclaimer, the term of this patent is extended or adjusted under 35 U.S.C. 154(b) by 0 days.

(21) Appl. No.: 13/807,604

(22) PCT Filed: Jun. 28, 2010

(86) PCT No.: PCT/JP2010/060983
§ 371 (c)(1),
(2), (4) Date: Dec. 28, 2012

(87) PCT Pub. No.: WO2012/001760
PCT Pub. Date: Jan. 5, 2012

(65) Prior Publication Data
US 2013/0130957 A1    May 23, 2013

(51) Int. Cl.
*C10M 133/16*  (2006.01)
*C10M 135/10*  (2006.01)
*C10M 141/08*  (2006.01)
*F16C 33/66*   (2006.01)

(52) U.S. Cl.
CPC ........ C10M 135/10 (2013.01); C10M 141/08 (2013.01); F16C 33/6633 (2013.01); *C10M 2205/0285* (2013.01); *C10M 2207/126* (2013.01); *C10M 2207/1265* (2013.01); *C10M 2207/1285* (2013.01); *C10M 2207/2835* (2013.01); *C10M 2207/2895* (2013.01); *C10M 2215/04* (2013.01); *C10M 2215/1026* (2013.01); *C10M 2219/04* (2013.01); *C10M 2219/044* (2013.01); *C10N 2230/12* (2013.01); *C10N 2240/02* (2013.01); *C10N 2240/04* (2013.01); *C10N 2240/10* (2013.01); *C10N 2240/20* (2013.01); *C10N 2240/30* (2013.01); *C10N 2250/10* (2013.01)

(58) Field of Classification Search
CPC ................................ C10M 2219/044
USPC ................................ 508/411, 418
See application file for complete search history.

(56) References Cited

U.S. PATENT DOCUMENTS

| | | | |
|---|---|---|---|
| 2009/0003742 A1 | 1/2009 | Nakatani et al. | |
| 2009/0062165 A1* | 3/2009 | Denis et al. | 508/172 |
| 2012/0142566 A1 | 6/2012 | Yamamoto | |

FOREIGN PATENT DOCUMENTS

| | | |
|---|---|---|
| CN | 101107347 | 8/2011 |
| EP | 2 465 916 | 6/2012 |
| JP | 5-140576 | 6/1993 |
| JP | 5-247485 | 9/1993 |
| JP | 2883134 | 2/1999 |
| JP | 2002-53884 | 2/2002 |
| JP | 2002-323053 | 11/2002 |
| JP | 2010-31123 | 2/2010 |
| WO | 2006/078035 | 7/2006 |
| WO | WO 2006/078035 | 7/2006 |
| WO | 2008/050834 | 5/2008 |

OTHER PUBLICATIONS

International Search Report for PCT/JP2010/060983 dated Sep. 28, 2010.
Chinese Office Action issued for Chinese Patent Application No. 201080067789.2 dated Jul. 30, 2013 (6 pages).
German Office Action issued in App. No. 11 2010 005 707.9 dated Feb. 6, 2017 (w/ translation).

* cited by examiner

*Primary Examiner* — Vishal Vasisth
(74) *Attorney, Agent, or Firm* — Nixon & Vanderhye P.C.

(57) ABSTRACT

The invention provides a grease composition containing a base oil, a thickener and a rust inhibitor, characterized in that the rust inhibitor includes an organic sulfonate and a fatty acid amine salt. The grease composition of the invention exhibits excellent rust preventing characteristics and causes little damage to the environment.

9 Claims, No Drawings

GREASE COMPOSITION AND MECHANICAL PART

This application is the U.S. national phase of International Application No. PCT/JP2010/060983 filed 28 Jun. 2010 which designated the U.S., the entire contents of which is hereby incorporated by reference.

TECHNICAL FIELD

The present invention relates to a grease composition, particularly a grease composition having excellent rust preventing characteristics; and a mechanical part, in particular a bearing, employing the above-mentioned grease composition.

BACKGROUND ART

A variety of mechanical parts have the problem of corrosion. For example, the rolling bearing parts for the automotive electrical equipment and engine auxiliaries including alternators, electromagnetic clutches and the like have the problem of corrosion resulting from permeation of water on the road, salt water or sea water during the operation; the rolling bearing parts for industrial machinery including compressors, blowers and the like also have the problem of corrosion resulting from permeation of cooling water and penetration of rainwater or sea water when installed outside; and the rolling bearing parts for the motor of home electrical appliances such as washing machines, refrigerators, and bathroom ventilating fans and bathroom ventilator dryer system which have become popular in recent years also have the problem of corrosion because they are exposed to high humidities.

In the above-mentioned rolling bearings subject to corrosion, the corrosive substances are prevented from invading the bearings by provision of a proper sealing or modifying the mechanism.

For the above-mentioned rolling bearing in the automobile, for example, it is proposed to install the rolling bearing at a position where the rolling bearing does not come in direct contact with muddy water or the like or to mount a fender or the like to protect the rolling bearing.

In light of the mechanism of rolling bearing, however, complete sealing of the rolling bearing cannot be achieved. Then, a lubricating grease used for the rolling bearing is required to have rust preventing characteristics.

For example, JP 2883134 B discloses a grease composition comprising rust inhibitors, i.e., an oil-soluble organic inhibitor, a water-soluble inorganic passivator and a non-ionic surfactant.

JP 5-140576 A discloses a grease composition to be enclosed in bearings, comprising barium sulfonate as a rust inhibitor.

Sodium nitrite, which has been considered to be good and widely used as the water-soluble inorganic passivator was found to produce a carcinogen, N-nitroso-amine when reacting with secondary amine. There is serious concern about an adverse effect on human body.

The organic sulfonate such as barium sulfonate has been widely used as the oil-soluble organic inhibitor. However, when the organic sulfonate is used alone, the rust inhibiting effect is found to be unsatisfactory under severe conditions, especially in the presence of salt water or seawater.

In addition, there is a movement to impose self-restraint on barium sulfonate as an environmentally damaging substance, as described in NTN Technical Review No. 73 (2005), pp 10-13.

SUMMARY OF INVENTION

An object of the invention is to provide a grease composition which exhibits excellent rust preventing characteristics and causes little damage to the environment.

Another object of the invention is to provide a mechanical part, in particular, a bearing employing the above-mentioned grease composition.

The present invention provides a grease composition and a mechanical part using the above grease composition, as shown below.

1. A grease composition comprising a base oil, a thickener and a rust inhibitor, characterized in that the rust inhibitor comprises an organic sulfonate and a fatty acid amine salt.
2. The grease composition as described in the above-mentioned item 1, characterized in that the organic sulfonate is at least one selected from the group consisting of calcium sulfonate and zinc sulfonate.
3. The grease composition as described in the above-mentioned item 1 or 2, characterized in that the fatty acid amine salt is a salt of amine with a fatty acid having 4 to 22 carbon atoms.
4. The grease composition as described in any one of the above-mentioned items 1 to 3 for a rolling bearing.
5. A mechanical part using the grease composition as described in any one of the above-mentioned items 1 to 4.

The grease composition of the invention has excellent rust preventing characteristics even under the severe conditions susceptible to corrosion.

DESCRIPTION OF EMBODIMENTS

The thickener used in the grease composition of the invention is not particularly limited. For example, metal soaps including lithium, sodium or the like, and non-soaps such as Benton, silica gel, urea compounds, fluorine-containing thickeners such as polytetrafluoroethylene and the like can be used. The urea compounds and lithium soaps are particularly preferred because those are practical thickeners in terms of fewer disadvantages and lower price.

The thickeners may be used alone or in combination.

Preferably, the grease composition of the invention may have a consistency of 200 to 400. The content of the thickener may be determined to obtain the above-mentioned consistency. Typically, the content of the thickener may preferably be in the range of 3 to 30% by mass, more preferably 5 to 30% by mass, and most preferably 8 to 25% by mass, based on the total mass of the grease composition.

The base oil used in the grease composition of the invention is not particularly limited. It is possible to use any kind of base oils, for example, mineral oils; and a variety of synthetic oils, such as ester type synthetic oils including diester oils and polyol ester oils, synthetic hydrocarbon oils including poly α-olefin oils and polybutene, ether type synthetic oils including alkyl diphenyl ethers and polypropylene glycols, silicone oils, fluorinated oils and the like. In particular, ester type synthetic oils, synthetic hydrocarbon oils, and ether type synthetic oils are preferable because the low-temperature properties and the heat resistance are excellent.

One kind of base oil may be used alone or two or more kinds of base oils may be used in combination.

The rust inhibitor used in the invention comprises as the essential components an organic sulfonate and a fatty acid amine salt.

With respect to the above-mentioned sulfonate, for example, petroleum sulfonic acid, dinonyl naphthalenesulfonic acid or the like can be used as a sulfonic acid component. The sulfonate may preferably be in the form of a metal salt, more preferably in the form of a calcium salt, magnesium salt, sodium salt, potassium salt, lithium salt, zinc salt or the like. Particularly, calcium salt or zinc salt is preferred.

In the grease composition of the invention, the organic sulfonate may be used alone or two or more organic sulfonates may appropriately be used in combination.

The content of the organic sulfonate in the grease composition of the invention may preferably be 0.1 to 10% by mass, more preferably 0.1 to 8% by mass, and most preferably 0.2 to 5% by mass on a basis of the active ingredient.

Preferable fatty acids for constituting the above-mentioned fatty acid amine salt may have 4 to 22 carbon atoms, more preferably 8 to 18 carbon atoms. The fatty acid may be a saturated or unsaturated fatty acid, and in addition, may be a straight-chain, branched, cyclic or hydroxyfatty acid. Specific examples of the fatty acid include stearic acid, palmitic acid, myristic acid, lauric acid, isostearic acid, octylic acid, undecylenic acid, oleic acid, hydroxystearic acid and the like.

An amine for constituting the above-mentioned fatty acid amine salt is not particularly limited, but preferably a saturated or unsaturated amine having 1 to 42 carbon atoms, more preferably a saturated or unsaturated amine having 4 to 22 carbon atoms.

Specific examples of the amine include octylamine, laurylamine, myristylamine, stearylamine, behenylamine, oleylamine, beef tallow alkylamine, hardened beef tallow alkylamine, aniline, benzylamine, cyclohexylamine, diethylamine, dipropylamine, dibutylamine, diphenylamine, dibenzylamine, dicyclohexylamine, triethylamine, tributylamine, dimethyloctylamine, dimethyldecylamine, dimethylstearylamine, dimethyl beef tallow alkylamine, dimethyl hardened beef tallow alkylamine, dimethyloleylamine and the like.

In the grease composition of the invention the fatty acid amine salt may be used alone or two or more fatty acid amine salts may be used in combination.

The content of the fatty acid amine salt in the grease composition of the invention may preferably be 0.05 to 5% by mass, more preferably 0.05 to 3% by mass, and most preferably 0.1 to 2% by mass on a basis of the active ingredient.

In addition to the above-mentioned organic sulfonate and fatty acid amine salt, the grease composition of the invention may further comprise any additives typically used in grease compositions, as required. The additives may be used alone or in combination. Examples of the additives include an antioxidant, a metal deactivator, a detergent dispersant, an extreme-pressure agent, an anti-foam, a demulsifier, an oiliness improver, an antiwear agent, a solid lubricant and the like.

EXAMPLES

Grease compositions were prepared as shown in Tables 1 and 2 from the components listed below. After addition of the predetermined amount(s) of additive(s) to each base grease, the mixture was thoroughly blended and kneaded using a three-roll mill.

Base Greases:
(A) Thickener: Lithium 12-hydroxystearate
Base oil: Polyol ester with a kinematic viscosity of 34.0 mm$^2$/s at 40° C. Consistency: 250
(B) Thickener: Diurea compound (i.e., a reaction product of p-toluidine (2 mol) with diphenylmethane diisocyanate (1 mol))
Base oil: Poly α-olefin with a kinematic viscosity of 48.0 mm$^2$/s at 40° C. Consistency: 280

Rust Inhibitors:
(C) Calcium sulfonate (calcium salt of dinonylnaphthalenesulfonic acid)
(D) Zinc sulfonate (zinc salt of dinonylnaphthalenesulfonic acid)
(E) Fatty acid amine salt (i.e., a mixture of a salt of fatty acid having 8 carbon atoms and an amine having 12 carbon atoms and a salt of fatty acid having 18 carbon atoms and mixed amines having 12 to 20 carbon atoms (at a ratio by mass of 2:1))

<Test Method>
Rust preventing characteristics: Emcor rust test (IP220) using synthetic sea water (ISO 7120)
Assessment method: by observing the presence of rust on the rolling surface of outer ring (n=2)
Acceptable Rating 0: no evidence of corrosion
Unacceptable 1: no more than three tiny spots of corrosion
2: up to 1% surface area of corrosion
3: between 1% and 5% surface area of corrosion
4: between 5% and 10% surface area of corrosion
5: more than 10% surface area of corrosion

TABLE 1

|  |  | Ex. 1 | Ex. 2 | Ex. 3 | Ex. 4 | Ex. 5 | Ex. 6 |
|---|---|---|---|---|---|---|---|
| Base Grease |  | (A) | (A) | (A) | (A) | (A) | (B) |
| Rust | (C) | 0.50 | — | 0.25 | 0.20 | 5.00 | 0.25 |
| Inhibitors | (D) | — | 0.50 | 0.25 | — | — | 0.25 |
|  | (E) | 0.50 | 0.50 | 0.50 | 2.00 | 0.10 | 0.50 |
| Results of Emcor Rust Test |  | 0.0 | 0.0 | 0.0 | 0.0 | 0.0 | 0.0 |

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| Base Grease |  | (A) | (A) | (A) | (A) | (B) |
| Rust | (C) | 1.00 | — | 0.50 | — | 0.50 |
| Inhibitors | (D) | — | 1.00 | 0.50 | — | 0.50 |
|  | (E) | — | — | — | 1.00 | — |
| Results of Emcor Rust Test |  | 2.2 | 2.2 | 2.2 | 2.2 | 2.2 |

No corrosion was detected in Examples 1 to 6 where the organic sulfonate (rust inhibitors (C) and (D)) and the fatty acid amine salt (rust inhibitor (E)) were used in combination, which demonstrated excellent rust preventing characteristics.

Detection of the corrosion proved the inferior rust preventing characteristics in Comparative Examples 1, 2, 3 and 4 respectively using the rust inhibitor (C), the rust inhibitor (D), combination of the rust inhibitors (C) and (D), and the rust inhibitor (E) so that the total amount of rust inhibitor(s) might be the same as that in Examples 1 to 3.

Detection of the corrosion proved the inferior rust preventing characteristics in Comparative Example 5 using combination of the rust inhibitors (C) and (D) so that the total amount of rust inhibitors might be the same as that in Example 6.

As can be seen from the above-mentioned Examples, the grease compositions of the invention were found to have excellent ability to prevent corrosion under highly corrosive conditions because of combined use of the organic sulfonate and the fatty acid amine salt.

The invention claimed is:

1. A grease composition comprising a base oil, a thickener and a rust inhibitor,
    wherein the rust inhibitor comprises an organic sulfonate and a fatty acid amine salt,
    wherein the base oil is selected from the group consisting of ester type synthetic oils, synthetic hydrocarbon oil, ether type synthetic oil and combinations thereof,
    wherein the thickener is an urea compound or lithium soap,
    wherein the base oil is contained in an amount of at least 68%, the thickener is contained in an amount of 8 to 25%, the organic sulfonate is contained in an amount of 0.2 to 5%, and the fatty acid amine salt is contained in an amount of 0.1 to 2% by mass, all mass percent being based on the total mass of the grease composition,
    wherein the organic sulfonate is at least one selected from the group consisting of calcium sulfonate and zinc sulfonate, and
    wherein the fatty acid amine salt is an amine salt of a fatty acid having 4 to 22 carbon atoms.

2. The grease composition of claim 1 for a rolling bearing.

3. A mechanical part using the grease composition of claim 1.

4. The grease composition of claim 1, wherein the base oil is selected from the group consisting of ester type synthetic oils selected from the group consisting of diester oils and polyol ester oils; synthetic hydrocarbon oil selected from the group consisting of poly α-olefin and polybutene; an ether type synthetic oil selected from the group consisting of alkyl diphenyl ethers; and combinations thereof.

5. The grease composition of claim 1, wherein the organic sulfonate is a metal salt of petroleum sulfonic acid or dinonyl naphthalenesulfonic acid.

6. The grease composition of claim 1, wherein the fatty acid amine salt is an amine salt of a fatty acid having 8 to 18 carbon atoms.

7. The grease composition of claim 1, wherein the fatty acid amine salt is an amine salt of stearic acid, palmitic acid, myristic acid, lauric acid, isostearic acid, octylic acid, undecylenic acid, oleic acid, or hydroxystearic acid.

8. The grease composition of claim 1, wherein the amine for constituting the fatty acid amine salt is a saturated or unsaturated amine having 1 to 42 carbon atoms.

9. The grease composition of claim 1, wherein the grease composition has a worked penetration of 200 to 400.

* * * * *